United States Patent [19]

Rautenstrauch

[11] 4,048,120

[45] Sept. 13, 1977

[54] METHOD OF IMPROVING, ENHANCING OR MODIFYING PERFUME USING CYCLOBUTANE DERIVATIVES

[75] Inventor: Valentin Rautenstrauch, Grand-Lancy, Switzerland

[73] Assignee: Firmenich S.A., Geneva, Switzerland

[21] Appl. No.: 690,359

[22] Filed: May 26, 1976

[30] Foreign Application Priority Data

June 6, 1975 Switzerland .......................... 7355/75

[51] Int. Cl.$^2$ ............................................. C11B 9/00
[52] U.S. Cl. .................. 252/522; 131/17 R; 426/538; 560/124
[58] Field of Search .................... 252/522; 260/468 H

[56] References Cited

U.S. PATENT DOCUMENTS

| | | | |
|---|---|---|---|
| 2,848,478 | 8/1958 | Pratt | 260/468 H |
| 3,030,337 | 4/1962 | Hedrick | 260/468 H |
| 3,063,970 | 11/1962 | Hedrick | 260/468 H |
| 3,361,820 | 1/1968 | White | 252/522 |

OTHER PUBLICATIONS

Chem. Ab. 67, 64961e, 1967.

*Primary Examiner*—Veronica O'Keefe
*Attorney, Agent, or Firm*—Pennie & Edmonds

[57] ABSTRACT

Cyclobutane derivatives useful as odor-modifying ingredients for manufacturing perfumes and perfumed products, and as flavor-modifying ingredients for the manufacture of artificial flavors or for flavoring foodstuffs, feedstuffs, beverages, pharmaceutical preparations or tobacco products.

1 Claim, No Drawings

METHOD OF IMPROVING, ENHANCING OR MODIFYING PERFUME USING CYCLOBUTANE DERIVATIVES

SUMMARY OF THE INVENTION

The invention relates to a method for improving, enhancing or modifying the organoleptic properties of perfumes or perfumed products, or of foodstuffs, feedstuffs, beverages, pharmaceutical preparations or tobacco products which comprises adding thereto a small but effective amount of at least one compound having the formula

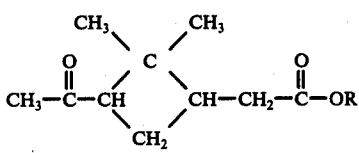

I wherein the symbol R represents a linear or branched alkyl radical containing from 1 to 6 atoms.

In the generic formula given hereinabove, the symbol R defines alkyl radicals such as methyl, ethyl, propyl, butyl, pentyl or hexyl, for example.

The invention further relates to a perfume or a flavour-modifying composition comprising as an active ingredient at least one compound having the formula I as set forth hereinabove.

The invention finally relates to a perfumed product or a foodstuff, an animal feed, a beverage, a pharmaceutical preparation or a tobacco product comprising as an odour- or flavour-modifying ingredient at least one compound having the formula I as set forth hereinabove.

BACKGROUND OF THE INVENTION

The compounds to which it is referred in the present invention derive from 2,2-dimethyl-3-acetyl-cyclobutylacetic acid, also known in the art as pinonic acid. The said pinonic acid derivatives are prior known compounds and have already been described in the scientific literature as plasticizers [cf. Latv. PSR Zinat. Akad. Vestis, Kim. 1966, 670 reported in Chem. Abstr. 67, 64961 e (1967)]. The above-cited literature remains, however, mute with respect to the organoleptic properties of compounds I and does not even suggest that these compounds could be useful in the art, either as perfuming or as flavour-modifying ingredients as such, or as starting materials for the preparation of analogous or homologous derivatives useful as perfuming or flavouring agents.

The present invention has the merit of dealing with a problem which has apparently been neglected up to now by the industry and of providing the man in the art with a new series of valuable perfuming and flavour-modifying ingredients.

THE INVENTION

I have in fact surprisingly found that the compounds of formula I possess particularly interesting organoleptic properties and that they can therefore by advantageously used in the art as perfuming and flavour-modifying ingredients.

In the field of perfumery, compounds I are characterized by their original and rather strong green odour which is accompanied, in certain cases, by a woody, resinous, pine-or castoreum-like nuance. Their most interesting olfactive effect consists in developing or enhancing a fresh and natural tone in the perfume compositions in which they have been incorporated. This corresponds to the actual tendency of modern perfumery. Compounds I can consequently be used for the manufacture of various perfume compositions such as, for example, chypre, amber-like, woody, green or leather-like compositions. Compounds I are also appreciated in the art for the preparation of perfumed products such as soaps, detergents, household materials or cosmetic preparations, for example.

When compounds I are used in accordance with the present invention, for example as ingredients for the manufacture of perfume compositions, interesting olfactive effects may be achieved by the use of proportions comprised between about 0.5 and 10, 20 or even 30 percent of the total weight of the said composition. The most interesting effects are preferably achieved by the use of proportions comprised between about 1 and 10 percent. However, depending on the particular effects which may be desired, larger or smaller amounts than the limits given above may also be used.

In the field of flavours, the compounds of formula I are characterized by a fruity and more or less woody, fatty and animal taste, reminiscent in certain instances of that of bornyl acetate and costus. Compounds I may therefore be advantageously used for preparing artificial flavours or for flavouring foodstuffs, feedstuffs, beverages, pharmaceutical preparations or tobacco products. Compounds I may be used to this purpose in isolated form or, more frequently, in admixture with other flavouring ingredients, excipients or diluents.

As mentioned hereinabove, compounds I derive from pinonic acid and may be easily prepared from the latter by means of the usual techniques — see, for example, Ann. Chim. (Paris) 10, 35 (1955). 2,2-Dimethyl-3-acetyl-cyclobutyl-acetic acid may thus be converted into its methyl, ethyl, propyl, isopropyl, butyl or isobutyl ester for example. The said acid may also be first converted into its butyl ester, the lower homologues thereof being then prepared by a transesterification of same according to the usual techniques.

In view of their particular chemical structure, more precisely in view of the presence of an acetyl and a —CH$_2$C(O)OR group at positions 3 and 1 respectively of the cyclobutane ring, compounds I may exist in the form of two stereoisomers. This fact may be visualized as indicated hereinbelow, for methyl 2,2-dimethyl-3-acetyl-cyclobutyl acetate (Ia):

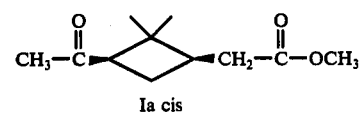

Ia cis

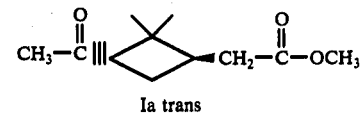

Ia trans

Compound Ia cis, for example, may be prepared from cis 2,2-dimethyl-3-acetyl-cyclobutylacetic acid according to the conventional techniques — see for example Ann. Chim (Paris) op. cit. Compound Ia trans can be obtained by either esterification of the corresponding acid or epimerisation of Ia cis according to the usual techniques.

Compounds I are however more often obtained in the form of isomeric mixtures of both cis and trans isomers in various relative proportions. In accordance with the present invention, compounds I may either be used in the form of the isomeric mixtures obtained or in their pure isomeric state. Pure isomers can be separated from one another by means, for example, of fractional distillation, by making use of a spinning band column, or by means of preparative vapour phase chromatography of the mixture obtained.

The following description relates to certain of the cyclobutane derivatives included in formula I.

Methyl 2,2-dimethyl-3-acetyl-cyclobutylacetate (cis isomer): obtained from cis pinonic acid (ALDRICH Europe — Janssen Pharmaceutica N.V. — Belgium) by means of an esterification with diazomethane (yield: 94%).

IR (neat) : 2950, 1730, 1695, 1165, 1000 cm$^{-1}$

NMR(90 MHz, CDCl$_3$): 0.87 (3H, s); 1.36 (3H, s); 1.95 (2H, t, J = 7 cps); 2.06 (3H, s); 2.32 (3H, m); 2.90 (1H, m); 3.68 (3H, s) δ ppm MS : M+ = 198; m/e: 183, 167, 141, 128, 109, 98, 83, 69, 55, 43.

Methyl 2,2-dimethyl-3-acetyl-cyclobutylacetate (trans isomer): obtained from the above cis ester derivative by heating it in the presence of methyl alcohol and of catalytic amounts of p-toluenesulfonic acid (yield: 99%).

IR (neat) : 2950, 1735, 1700, 1430, 1365, 1165, 1000 cm$^{-1}$

NMR (90 MHz, CDCl$_3$): 1.00 (3H, s); 1.18 (3H, s); 2.04 (3H, s); 2.40 (5H, m + s); 2.94 (1H, m); 3.71 (3H, s) δ ppm MS : M+ = 198; m/e: 183, 167, 141, 128, 109, 98, 83, 69, 55, 43.

Methyl 2,2-dimethyl-3-acetyl-cyclobutylacetate is obtained as a 70:30 cis/trans isomeric mixture, after treatment of cis pinonic acid by means of methanol and p-toluenesulfonic acid.

Ethyl 2,2-dimethyl-3-acetate-cyclobutylacetate: obtained in a 40% yield from cis pinonic acid after treatment thereof by means of ethyl alcohol in the presence of catalytic amounts of p-toluenesulfonic acid. The isolated product consists in a 65:35 cis/trans mixture of isomers according to the vapour phase chromatography (VPC) analysis.

IR (neat): 2956, 1735, 1705, 1365, 1175, 1030 cm$^{-1}$

MS : M+ = 212; m/e: 197, 167, 155, 142, 125, 109, 98, 83, 69, 55, 43.

Propyl 2,2-dimethyl-3-acetyl-cyclobutylacetate: obtained from the corresponding isobutyl ester by heating it in the presence of propyl alcohol and of a catalytic amounts of p-toluenesulfonic acid. The product thus prepared was isolated in the form of a 65:35 cis/trans isomeric mixture as indicated by a VPC analysis (yield: 95%).

IR (neat): 2950, 1740, 1700, 1460, 1365, 1165, 1055, 990 cm$^{-1}$

MS : M+ = 226; m/e: 167, 156, 141, 125, 114, 98, 83, 69, 57, 43.

Butyl 2,2-dimethyl-3-acetyl-cyclobutylacetate: obtained from cis pinonic acid according to the method described in Helv. Chim. Acta 56, 2502 (1973) — yield: 30% —. The product was isolated as a 60:40 cis/trans mixture according to the VPC analysis.

IR (neat): 2950, 1735, 1710, 1465, 1365, 1170, 1060, 1020, 945 cm$^{-1}$

MS : M+ = 240; m/e: 183, 167, 153, 141, 125, 114, 98, 83, 69, 57, 43.

Isobutyl 2,2-dimethyl-3-acetyl-cyclobutylacetate: prepared from the corresponding butyl ester by heating it in the presence of isobutyl alcohol and of a catalytic amounts of p-toluenesulfonic acid. The product was isolated in a 95% yield as a 60:40 cis/trans mixture according to the VPC analysis — b.p.76°-94° C/0.01 Torr.

The following derivatives can also be prepared according to the method described above: pentyl 2,2-dimethyl-3-acetyl-cyclobutylacetate, isopentyl 2,2-dimethyl-3-acetyl-cyclobutylacetate, hexyl 2,2-dimethyl-3-acetyl-cyclobutylacetate and isohexyl 2,2-dimethyl-3-acetyl-cyclobutylacetate for example.

Pinonic acid, used hereinabove as starting material, is a commerical product easily available on the market. It can also be prepared from α-pinene as illustrated hereinbelow:

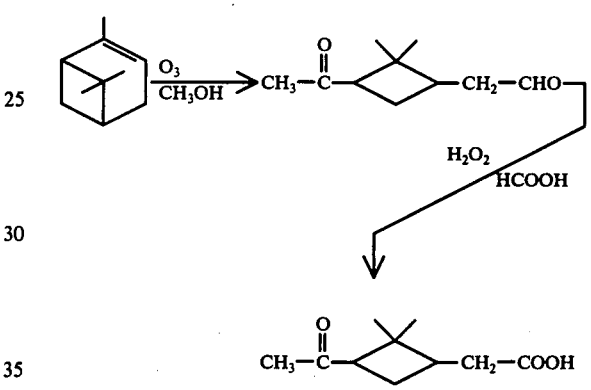

Pinonic acid may further be obtained from α-pinene by treating it with KMnO$_4$ in accordance with the method described in J. Amer. Chem. Soc. 93, 195 (1971).

The present invention will be better illustrated by, but not limited to, the following examples.

EXAMPLE 1

A base perfume composition was prepared by admixing the following ingredients (parts by weight):

| | |
|---|---|
| Isobornyl acetate | 300 |
| Fenchyl acetate 10%* | 100 |
| Di-isobutylcarbinyl acetate | 100 |
| Terpenyl acetate | 60 |
| Lavandin oil | 40 |
| l-Limonene | 60 |
| Methylnonylacetic aldehyde 10%* | 60 |
| Ocimene-epoxide | 60 |
| "Caryophyllene formate"** | 40 |
| Galbanum oil 10% | 40 |
| Δ-3-Carene | 20 |
| Linalool | 20 |
| Total | 900 |

*in diethyl phthalate
**available from Firmenich SA, Geneva - see for example British Pat. No. 1,419,600

The base given above possesses an overall "pine-like" odour and is particularly suitable for perfuming products such as bubble bath preparations.

By the addition of 10 g of methyl 2,2-dimethyl-3-acetyl-cyclobutylacetate (70:30 cis/trans mixture — see preceding part of the specification) to 90 g of the above base one obtains a noticeable reinforcement of the pine-like character of the base which becomes at the same time greener and more natural.

By replacing in the above example methyl 2,2-dimethyl-3-acetyl-cyclobutylacetate by one of its homologues, similar effects, although less marked in certain cases, were observed.

EXAMPLE 2

A base perfume composition for a masculine-type Eau de toilette was prepared by admixing the following ingredients (parts by weight):

| | | |
|---|---|---|
| Methylionone | 160 | |
| Absolute oak moss 10%* | 100 | |
| Vetiveryl acetate | 80 | |
| Galbanum resinoid | 80 | |
| Bergamot oil | 80 | |
| Castoreum resinoid 10%* | 40 | |
| Trimethyl-cyclododecatriene-epoxide | 70 | |
| Portugal Floride | 40 | |
| Deterpenated lemon oil | 40 | |
| Cananga oil | 30 | |
| Musk ambrette | 30 | |
| Linalyl acetate | 30 | |
| Musk ketone | 20 | |
| Birchtar oil (dephenolated) | 20 | |
| Nutmeg oil 10%* | 20 | |
| Pepper oil | 10 | |
| Oriental sandalwood oil | 10 | |
| Styrax oil 10%* | 10 | |
| African geranium oil | 10 | |
| Absolute lavender (decolorized) | 10 | |
| Tunisian neroli oil | 10 | |
| Total | 900 | |

*in diethyl phthalate

By adding 10 g of ethyl 2,2-dimethyl-3-acetyl-cyclobutylactetate (65:35 cis/trans mixture — see preceding part of the description) to 90 g of the above base, there was obtained a new perfume composition possessing a rounder and richer woody odour than that of the said base, together with a leather-like note.

By replacing ethyl 2,2-dimethyl-3-acetyl-cyclobutylacetate in the above example by one of its homologues, similar results were observed.

What I claim is:
1. A method for improving, enhancing or modifying the organoleptic properties of perfumes which comprises adding thereto a small but effective amount of at least one compound having the formula

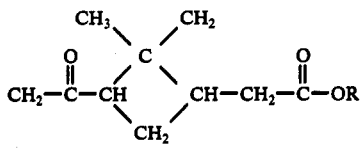

(I)

wherein the symbol R represents a linear or branched alkyl radical containing from 1 to 6 carbon atoms.

* * * * *

UNITED STATES PATENT AND TRADEMARK OFFICE
CERTIFICATE OF CORRECTION

PATENT NO. : 4,048,120
DATED : September 13, 1977
INVENTOR(S) : Valentin Rautenstrauch It is certified that error appears in the above-identified patent and that said Letters Patent are hereby corrected as shown below:

Column 1, line 22, "6 atoms" should read --6 carbon atoms--.

Column 1, line 63, "therefore by" should read --therefore be--.

Column 3, line 15 should be underlined.

Column 3, line 26 should be underlined.

Column 3, line 42 should be underlined.

Column 3, line 52 should be underlined.

Column 3, line 63 should be underlined.

Column 4, line 3 should be underlined.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks